United States Patent [19]
Langendorf et al.

[11] Patent Number: 5,809,228
[45] Date of Patent: Sep. 15, 1998

[54] METHOD AND APPARATUS FOR COMBINING MULTIPLE WRITES TO A MEMORY RESOURCE UTILIZING A WRITE BUFFER

[75] Inventors: Brian K. Langendorf, El Dorado Hills; Michael Derr, Folsom, both of Calif.

[73] Assignee: Intel Corporaiton, Santa Clara, Calif.

[21] Appl. No.: 579,414

[22] Filed: Dec. 27, 1995

[51] Int. Cl.⁶ .................................................. G06F 11/00
[52] U.S. Cl. ................ 395/185.06; 365/189.05; 365/230.08; 395/872; 371/40.11
[58] Field of Search ................ 395/182.03, 182.04, 395/250, 183.18, 185.05, 185.06, 185.07, 200.64, 292, 310, 872; 371/38.1, 40.1; 365/189.05, 230.08

[56] References Cited

U.S. PATENT DOCUMENTS

| | | |
|---|---|---|
| 5,214,777 | 5/1993 | Curry, Jr. . |
| 5,235,693 | 8/1993 | Chinnaswamy et al. . |
| 5,276,849 | 1/1994 | Patel . |
| 5,285,451 | 2/1994 | Henson et al. . |
| 5,450,422 | 9/1995 | Dell ........................................ 371/40.1 |
| 5,452,429 | 9/1995 | Fuoco ................................. 395/182.04 |
| 5,459,842 | 10/1995 | Begun ..................................... 395/250 |
| 5,459,849 | 10/1995 | Bergkvist ................................ 395/403 |
| 5,530,833 | 6/1996 | Iyengar .................................. 395/455 |
| 5,542,065 | 7/1996 | Burkes et al. . |

*Primary Examiner*—Albert Decady
*Attorney, Agent, or Firm*—Blakely, Sokoloff, Taylor & Zafman

[57] ABSTRACT

Apparatus and a method for testing each write to memory to determine whether it is addressed to an address identical to that of another write to memory waiting to be processed and merging the valid data in any subsequent writes to the same address until a memory write occurs.

29 Claims, 5 Drawing Sheets ns and METHOD AND APPARATUS FOR
COMBINING MULTIPLE WRITES TO A
MEMORY RESOURCE UTILIZING A WRITE
BUFFER

BACKGROUND OF THE INVENTION

1. Field Of The Invention

This invention relates to personal computer systems and, more particularly, to methods and apparatus for merging different increments of data being written to the same address in memory so that write operations require fewer steps and may be accomplished more rapidly.

2. History Of The Prior Art

In order to increase the speed of operation of personal computer systems, the operational speed of central processing units has constantly been increased. In general, state of the art processors run faster than transfers take place in other parts of a personal computer system. Writes from the central processing unit to main memory are often quite slow. Because of this, many prior art systems utilize write buffers on the memory bus between the central processing unit and main memory. Such a write buffer stores data which a processor is writing to main memory until main memory is ready to accept it. Write buffers are particularly advantageous when used with processors and other circuitry which have been designed to transfer data in bursts, the individual elements of each burst including an increment of individually addressed data of a size up to the memory bus width. Burst transfers are fast because a processor transfers a number of increments of data to be written on a memory bus or a local bus during a single bus access using only a single set of control signals. Transferring a plurality of increments of data to a write buffer allows the processor to pursue other operations utilizing data and instructions in its caches without having to wait for the slower memory operations to complete.

However, when a processor functions faster than data can be written to memory for some significant period, there will ultimately be insufficient space in the write buffers to hold all of the different increments of data being written. This is especially true in systems which store error correction code (ECC) with data in memory to enhance reliability because such systems write data to memory substantially more slowly than do systems which do not use error correction code.

Error correction code is generated as a part of an error correction process and is used to detect storage errors in memory arrays and correct some of those errors. An error correction process uses a math function to compute during data storage an error correction code (referred to herein as a check value or ECC value) which is unique to the data stored. The check value is stored in memory in association with the data. When the data is later read from memory, a determination is made whether the data read would produce the check value stored with the data. If the data would not produce the check value stored, some change has occurred in the data or the check value since they were first stored; and the data is untrustworthy. If the value has changed, then the data and the check value read from memory are sometimes used to accomplish the correction of the data depending on the type of error.

The amount of memory which is allotted to an ECC value is always a compromise, the more space allotted, the more accurate the check may be made but the less space remains for data. A typical ECC value for a sixty-four bit bus width increment of data stored in main memory may be eight bits. Such a value allows detection of all one and two bit errors, the detection of errors in four consecutive bits in certain types of memory, and the correction of all single bit errors. Computer system designers are usually unwilling to allot more than this percentage of space to memory reliability. Consequently, systems which use error correction code typically do not compute an ECC value for each byte, word, or doubleword stored individually, but only for an entire bus width increment of data. However, since writing any data of any length to memory changes the data from which the ECC value is computed, a new ECC value must be computed on a bus width increment of data each time data of any length is written to memory.

Writes to memory in bus width increments have little effect on the speed of writing. However, to accomplish a write to memory of data less than the width of the memory bus (e.g., one byte or one word of a double word wide bus), a memory controller typically must use a full bus width of data with which to compute an ECC value. To use a bus width of data for a memory write less than bus width, the memory controller must read the data at the address in memory, check the data against the ECC value stored to make sure the data is correct, modify the data read from memory with the new data being written, generate a new ECC value, and write the modified data back to memory in a bus width increment along with the new ECC value. This is a time consuming process.

For example, in a system using error correction code, if a processor writes four separate data increments to memory each of which is one word in length and the four writes are individually addressed to the sequential four word addresses of the same quad word space in memory so that each write to memory occurs separately, then each write requires the time consuming read/check ECC/modify/generate ECC/write process. On the other hand, if the same four words are written to the same memory space as a single quad word, only a single write operation is required. This operation writes an entire valid quad word which replaces the quad word in memory so the write includes no read or modify steps and only a single ECC value generation.

The total time required to transfer the data as four individual words is at least eight times as long as that required to write a single quad word. Even four quad words are written much more rapidly than are four individual words with a quad word memory bus because each quad word requires only a single write operation. Thus, writing less than bus width data increments in a system using error correction code slows the draining of the write buffer and ultimately slows the operation of the computer.

It is desirable to increase the speed of writing to memory in a personal computer system using a write buffer and practicing burst write operations on data stored with error correction code.

Summary Of The Invention

It is, therefore, an object of the present invention to provide apparatus and a method for increasing the speed at which data is written from a write buffer to a memory array in a personal computer system.

This and other objects of the present invention are realized in a personal computer including a write buffer having a plurality of storage areas each capable of storing all of the valid data included in a bus width write from a source along with the address and status of that data. The valid data stored at one of the storage areas is supplemented by any new valid data included in later writes to the same memory address until a memory controller is ready to write the data in that storage area to memory. When the memory controller is ready to write data at a storage area to memory, it tests that data to determine whether all of the data is valid. If the data is all valid, it is written to the addressed memory space. If some of the data in a storage area of the write buffer is invalid, the memory space to which the data is addressed is read and valid data stored in that memory space is merged with the valid data being written to provide a complete bus width of valid data to the addressed memory space. Merging valid data from succeeding writes in the write buffer reduces the number of less than full bus width writes requiring read/modify/write operations and associated ECC value tests and computations thereby speeding the operation of the computer system.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
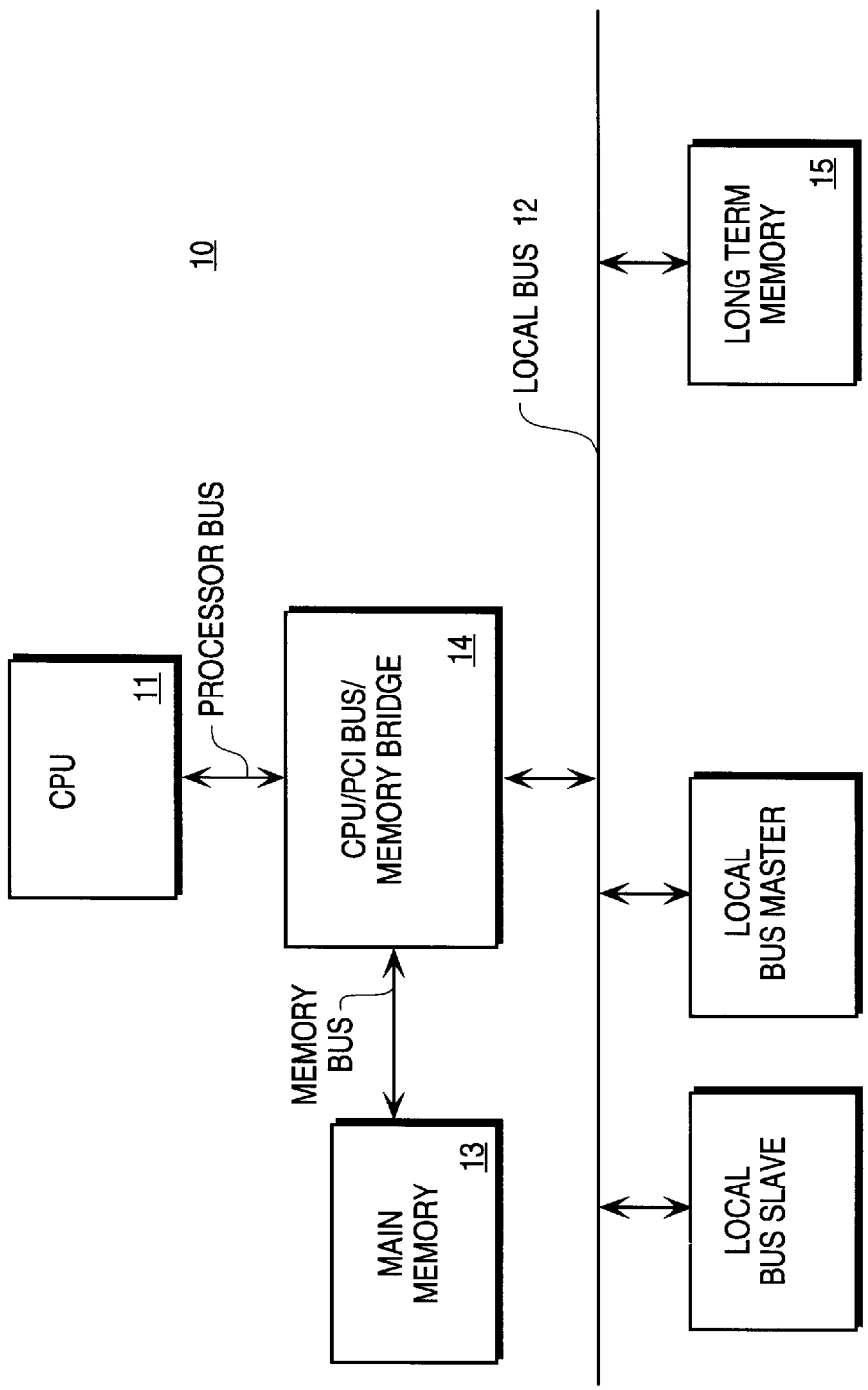
FIG. 1 is a block diagram of a personal computer system designed in accordance with the present invention.

Referring now to FIG. 1, there is illustrated a computer system 10 configured in accordance with one embodiment of the present invention. The system 10 illustrated includes a central processing unit 11 which executes the various instructions provided to control the operations of the system 10. The central processing unit 11 is typically joined by a processor bus to a bridge circuit 14 which controls access to a local bus 12 adapted to carry information between the various components of the system 10. In FIG. 1, the bus 12 is preferably a peripheral component interface (PCI) bus or other local bus adapted to provide especially fast transfers of data. In a typical system 10, various input/output devices are connected to the bus 12 as bus master and bus slave circuits. In the present illustration, for example, long term memory 15 may be joined to the PCI bus 12 as a bus slave circuit. Other input/output devices such as sound boards, frame buffers, and the like may also be joined to the bus 12.

The bridge circuit 14 is also joined by a memory bus to main memory 13. Main memory 13 is typically constructed of dynamic random access memory (DRAM) arranged in a manner well known to those skilled in the prior art to store information during a period in which power is provided to the system 10. Depending on the particular configuration, the bridge circuit 14 will typically include a secondary cache controller, a secondary cache (often referred to as a $L_2$ cache), a memory controller, and a number of buffers for storing data during its transfer between the processor, main memory, and the local bus. These components may be an integrated part of the bridge circuit 14 or, alternatively, be joined on a circuit board to the other components.

Figure 2:
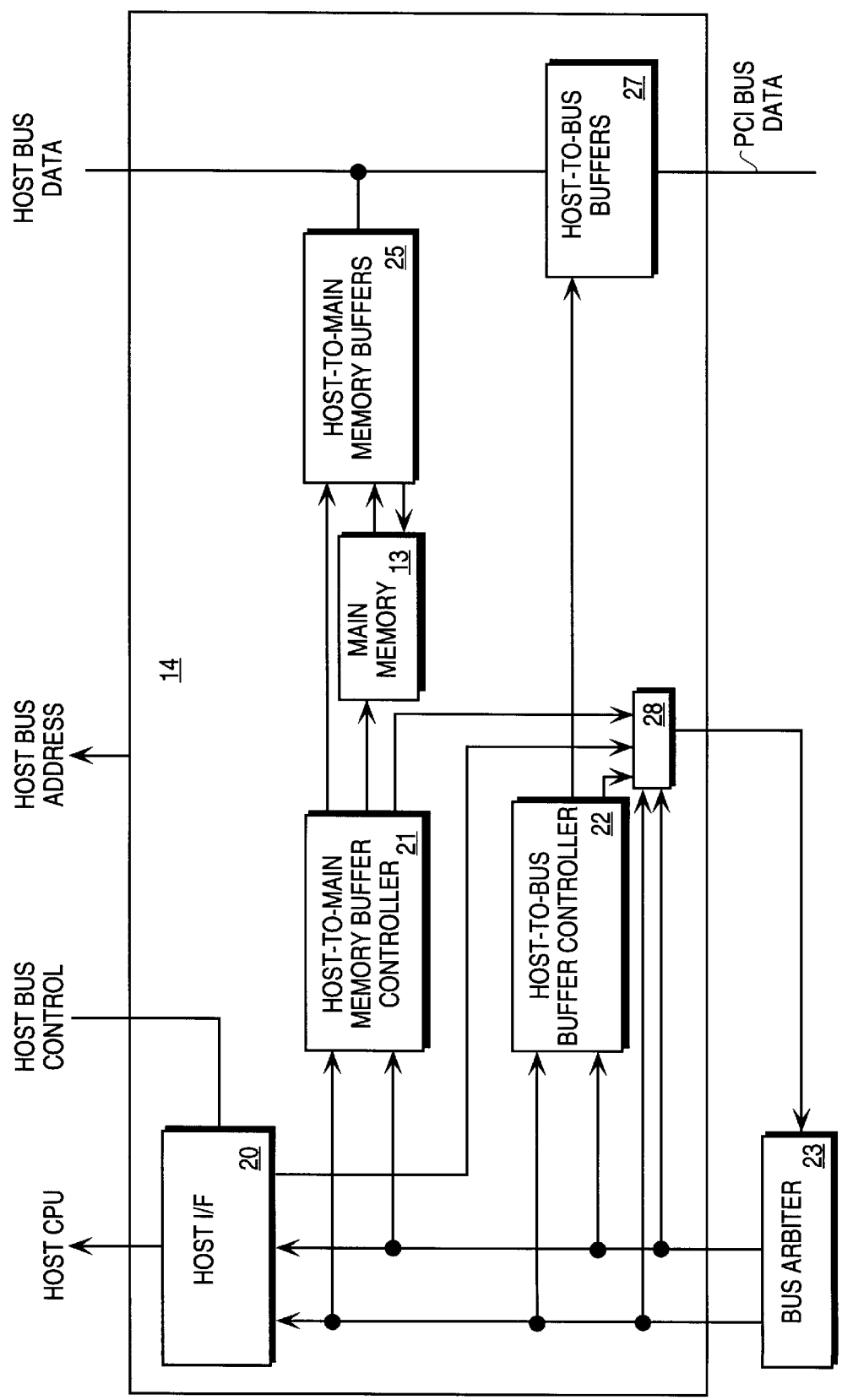
FIG. 2 is a block diagram of a bridge circuit designed in accordance with the present invention included in the system of FIG. 1.

FIG. 2 illustrates in more detail the arrangement of major components of the bridge circuit 14 related to the present invention and main memory 13. As may be seen in FIG. 2, the bridge circuit 14 includes a host interface 20 which joins the central processing unit 11 to the bridge circuit. The host interface 20 sends to and receives control signals from the central processing unit; it also sends to and receives control signals from various other components of the bridge circuit 14 including a host-to-main memory buffer controller 21 and a host-to-bus buffer controller 22. A bus arbiter circuit 23, typically not a part of the bridge circuit 14, controls access to the local bus 12. The host-to-main memory buffer controller 21, the host-to-bus buffer controller 22, and the bus arbiter circuit 23 all transfer control signals to a circuit 28 which generates control signals back to the bus arbiter circuit 23 to signal the state of operations related to bus access within the bridge circuit 14.

Also a part of the bridge circuit 14 are host-to-main memory buffers 25 and host-to-bus buffers 26. The host-to-main memory buffers 25 and host-to-bus buffers 26 respond to control signals from the host-to-main memory buffer controller 21 and the host-to-bus buffer controller 22 in carrying out their operations. The host-to-main memory buffers 25 include write buffers for buffering the transfer of write data provided from the central processing unit 11 (or, more generally, from any processor in other embodiments of the invention) on a host data bus for transfer on the memory bus to main memory 13. The host-to-bus buffer controller 22 controls the operation of host-to-bus buffers 27 which include write buffers for buffering the transfer of write data between the central processing unit 11 and the local bus 12 on the host data bus.

Figure 3:
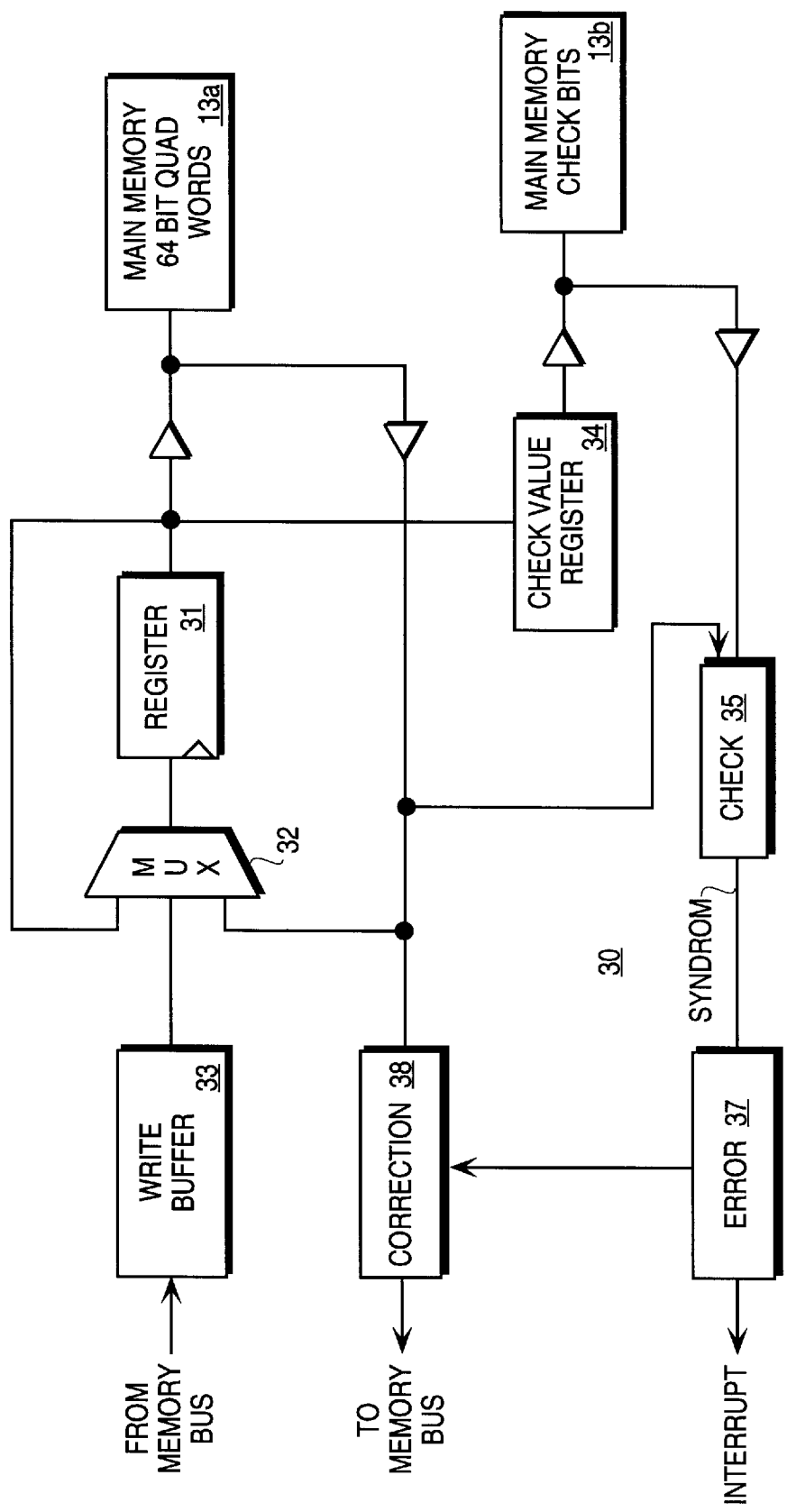
FIG. 3 is block diagram illustrating in more detail a write buffer which is a portion of the bridge circuit of FIG. 2.

FIG. 3 illustrates a circuit 30 in accordance with the present invention which is a portion of the host-to-main memory buffers 25 shown in FIG. 2. The circuit 30 includes a write buffer 33 which receives the individual increments of data written to memory 13 (typically from the processor). In a system with a quad word memory bus, the write buffer 33 includes a plurality of individual storage areas (typically hardware registers) each divided into a portion capable of storing an increment of data of a size up to the bus width, a portion storing a memory address for the data, and possibly a portion storing a number of status bits.

Figure 4:
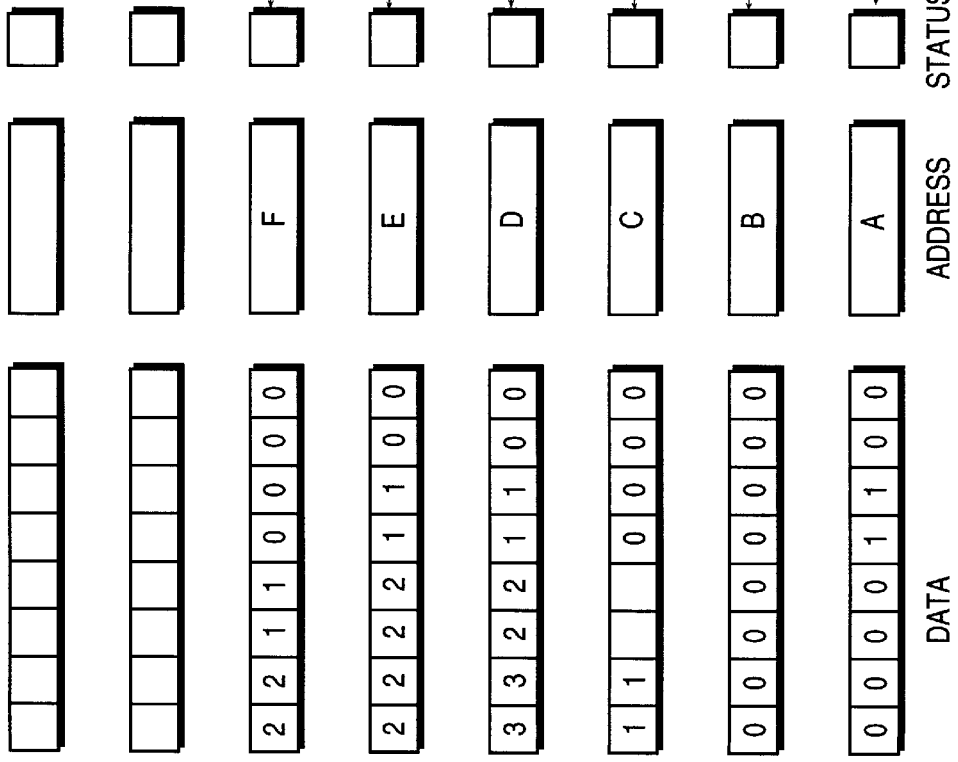
FIG. 4 is a diagram illustrating storage of data in one embodiment of the write buffer illustrated in FIG. 3.

FIG. 4 illustrates one embodiment of a write buffer 33 which includes eight individual storage areas each providing eight bytes of storage which may be allotted to the data included in eight sequential bus width write entries. As may be seen, each storage area in the buffer 33 of FIG. 4 also includes storage for an address and status bits. Other write buffers may embody a lesser or greater number of individual storage areas each capable of storing more or less write data. Thus, another particular write buffer may furnish data storage for only four increments of bus width write data so that four sequential data writes furnished in a burst may be stored therein.

When data is first written to the write buffer 33, one of the plurality of storage areas is allotted; and the data is stored with its address pointing to that area. Although FIG. 4 shows the address and status bits included in the same physical area of the buffer with each increment of data, the address and status bits might actually be stored apart from the data so long as they are associated with that area in a manner that the data in the area may be detected when data is written to a specific address by the central processing unit. Presuming that the write includes sufficient valid data to fill the storage area, all of the bytes are shown valid by the associated status bits. Succeeding writes to different addresses are each allocated an individual storage area and stored with associated address and status bits in a like manner.

Writes to memory from the buffer 33 occur in the sequence in which storage areas in the buffer 33 are allocated to write data for particular memory addresses. The data in a storage area holding the oldest valid data in the write buffer 33 is selected as the next to be written when the host-to-main memory control circuit 21 ("the write controller 21") is ready to write a next increment of data to main memory 13. The controller 21 tests the validity of all of the bytes which are in that storage area of the buffer 33. Presuming that data to be written to memory is an entire quad word of valid data, the controller 21 enables a multiplexor 32 to transfer the entire quad word, the quad word address, and status bits to a register 31. When the data in the write buffer 33 is written to the register 31, the data is invalidated in the write buffer 33.

Since all bytes of the data are presumed valid, the controller 21 generates an enabling signal which causes the data in the register 31 to be written to the addressed space in the main memory 13. In FIG. 3, the data is shown being written to a data storage portion 13a of main memory 13. At the same time, the data in the register 31 is also sent to a check value generator 34 (which may be, for example, a series of gates arranged to accept the data in parallel). The generator 34 generates and writes an ECC check value unique to the data to a check value portion 13b of the memory 13. The check value portion 13b may be physically with or apart from that memory which stores the data.

When the data in memory 13a is later read, the check value is also read. The data is transferred to a correction circuit 38 and to a check circuit 35. The check value is transferred to the check circuit 35 where the data and the check value cause a value referred to as a syndrom to be generated by the check circuit 35. The syndrom value is transferred to an error circuit 37 (which may be a lookup table or other correction arrangement known to those skilled in the art). If the data value read is correct, the value of the syndrom causes the error circuit to enable the correction circuit 38 to transfer the data without change to the memory bus. If the syndrom value indicates an error, signals are generated by the error circuit 37 to either correct the value of the data before transfer by the correction circuit 38 to the memory bus or to indicate that the data is incorrect. In one embodiment, the error circuit 37 generates a pattern of bits which change a single bit of the sixty-four bits of data read from the memory 13.

Utilizing the circuit 30 of FIG. 3, the process of writing to main memory 13 may be accelerated. FIG. 4 is a diagram illustrating a number of write operations to a plurality of storage areas of a write buffer 33. The individual write operations affecting each storage area are described, and the results of those write operations are shown in FIG. 4. Some of those operations are reviewed here If valid data has been transferred to the write buffer 33 and is waiting to be written to memory after the controller finishes an earlier operation and additional valid data from a later write operation is received at the input to the write buffer 33 addressed to the same quad word address as the valid data already in the write buffer, then this additional valid data is transferred to the storage area already allotted to valid data to be written to the same address. This additional valid data overwrites any data (valid or not) at the bit positions of the incoming valid data in the storage area (see FIG. 4, storage area holding data to address A). Thus, if all of the data in the addressed storage area is valid and new valid data is written to some or all of the bytes of the quad word addressed by the data in the storage area, the data residing in the storage area is updated by the new data; and all of the data in the storage area remains valid. Thus it will be seen, where two writes have occurred to the same quad word address space in memory and the first of these writes has not yet been written to memory when the second arrives, the result of both writes is combined before the write to memory so that only a single write of the latest valid data and a single computation of a check value is necessary.

The same result occurs if, after two writes have been combined, the controller is still not ready to write the data to memory 13. If any additional valid data addressed to that address is furnished to the write buffer 33, this data is written to the storage area containing the data already addressed to the same memory address. If this additional data is addressed to byte positions presently storing valid data in the storage area, then the data in the storage area is stale and is by this technique continually updated in the write buffer 33 (see FIG. 4, storage area holding data to addresses E and F). If the additional data to the write buffer 33 is addressed to byte positions presently storing data which is marked invalid, then the new data increases the amount of valid data in the addressed storage area and reduces the number of writes to memory (see FIG. 4, storage area holding data to address C). This data merger reduces the time required to write by at least one write operation for each write merger in a system which uses error correcting code and, if all of the data in the storage area is valid when the controller 21 is ready to write to memory, will reduce what would have been a series of read/modify/write operations to a single simple write operation. This drastically reduces the time required to write data to memory. Not only does reducing all read/modify/write operations in a system using error correcting code to simple writes eliminate those repetitive steps, it also eliminates the need to test old check values and generate new check values during each read/modify/write operation of the individual words.

If, as in the example described above, four writes of words to sequential word positions in the same quad word occur in a burst, then all of these words may be merged in the quad word space of a storage area of the write buffer 33 before being written to memory presuming that the write controller is occupied with other operations for a long enough period (see FIG. 4, storage area holding data to address D). Thus a burst of four write of individual words to sequential addresses of a quad word is reduced to a single write and the attendant generation of a single check value.

If valid data of any length exists in the write buffer 33 when the controller is ready to write to memory 13, then the operation begins without waiting. If the controller determines that all bytes of the quad word space of the storage area include valid data, the operation is a simple write of the data to memory along with a generation and write of a check value to memory. When the write occurs, the data in the storage area of the write buffer from which the data has been written is invalidated. If less than all of the quad word space of the storage area includes valid data in a system using error correction code, then the controller 21 transfers the data with its status bits to the register 31 and initiates a read of the data stored at the addressed quad word space in memory. The valid bytes of the data which is read from memory are stored to those byte positions of the register 31 holding data marked invalid and merge with the valid bytes furnished by the multiplexor 32 to the register 31. Following these read and modify operations, the quad word in the register 31 which now contains all valid bytes is written to the addressed quad word space in memory; and the check value is generated from the data written and stored in memory.

When data is written in bursts, it is likely that the data of the individual writes will be addressed to adjacent words or double words of a single quad word space (or other sized memory address) of main memory. This will allow a significant amount of merging to occur. In such a case, the time saved in implementing writes is very substantial.

In order to implement a write buffer which accomplishes merger of writes to the same address in this manner, one embodiment utilizes an individual address comparator for each storage area in which a data increment may be stored. Valid data present at the input to the write buffer 33 has its address tested in parallel by the comparators at each storage area. If the write buffer 33 is empty, a new storage area is allocated; and the valid data is stored at that storage area with its address and status. Whenever a storage area is allocated, all of the status bits are set to match the valid bits of the data being written. If, however, the address compares with the address of valid data at any storage area, the new valid data is written to those bytes of that storage area. When new valid data is merged with valid data previously written to the storage area, only the status bits related to that new valid data are updated to indicate validity. If the address does not compare with the address of valid data in any storage area of the write buffer, the valid data in the new write is stored in a newly allocated storage area in the write buffer; and all of the status bits are set to match the valid bits of the data being written. With each new write of valid data to the write buffer 33, the address is compared to the addresses of valid data entries. If the addresses are the same, the new valid data is merged with that entry; while if the address differs from the addresses of all data entries, a new storage area is allocated for the data. Once an entry has been written to memory, a global status bit for the storage area is marked invalid so that the space is free for reallocation. The individual byte status bits need not be invalidated since these will be updated to match new data when the storage area is again allocated.

In a write buffer with a plurality of storage areas, the valid data in the storage area which was first allocated is written first from the write buffer to memory (i.e., first in, first out). In order to accomplish this, in one embodiment the write buffer is a ring buffer which uses a pointer to the entry including the earliest data written to the register. Another way to implement this first-in first-out process would be to shift the data through from stage-to-stage of the buffer as each increment of data is written to memory.

In another embodiment of the invention, the hardware overhead required to allow data to be merged into any valid data in the write buffer 33 is reduced by allowing merger with only valid data in the last storage area to be allocated to a data entry. This eliminates the need for more than one comparator with the write buffer but requires that the valid data in the last storage area allocated be determinable. In the embodiment discussed using a pointer to the storage area first allocated, a pointer may also be furnished by which the most recently allocated storage area may be determined.

Figure 5:
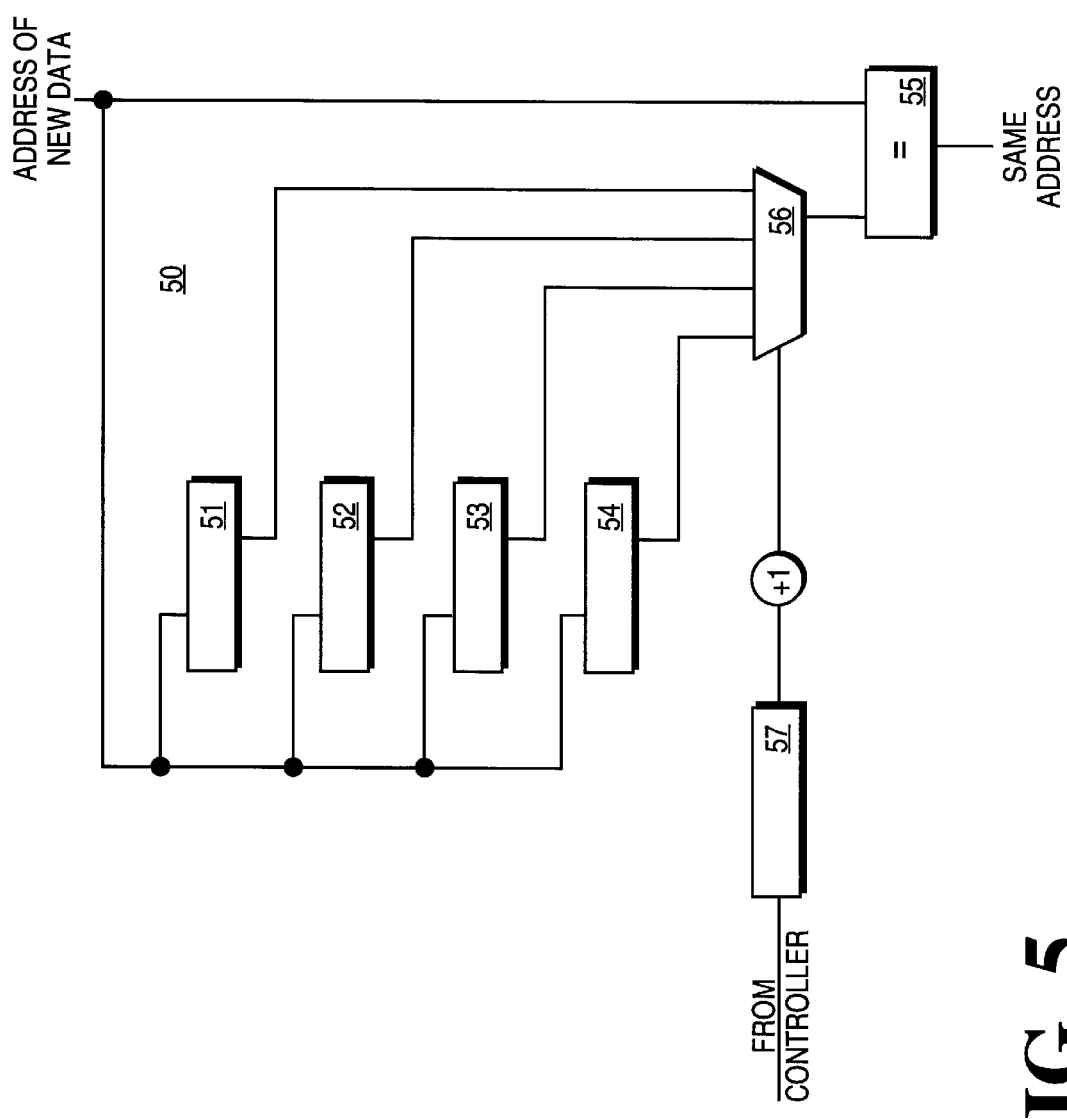
FIG. 5 is a block diagram illustrating in detail the implementation of one embodiment of the invention to provide the storage illustrated in FIG. 4.

FIG. 5 illustrates a comparison circuit 50 which may be used in such an embodiment to provide an indication that data in a new write is directed to the same address as data already stored in one of the storage areas. The circuit 50 illustrated includes at least that portion of each of the storage areas 51–54 (only four storage areas are illustrated in the particular embodiment) used to stored the address of an area which has been allocated to data directed to a particular address. Each of these storage areas 51–54 is connected to receive the address to which any new write is being sent should the data of that write be ultimately stored in the storage area. Each of these storage areas 51–54 is also connected to furnish any address it presently stores as an input to a multiplexor 56. Included as a part of this address is a global status bit providing the validity status of the data in the storage area. The multiplexor is enabled to transfer the last address to which data has been written to a comparator circuit 55. The comparator 55 also receives the address of the incoming write (along with a status bit indicating that the data is valid) and compares the incoming address to the address stored in the last storage area to which data has been written in the write buffer. If the addresses are the same (including the status bit indicating that valid data exists in the storage area), there is a hit; and the data is addressed to the same storage area. If the addresses are not the same, there is no hit; and the data is sent to the next storage area in the write buffer.

In the embodiment of FIG. 5, a register 57 is furnished a pointer to a next storage area available for allocation to data written to a new address so that the controller may know in which storage area to store data for which there is no address comparison. In FIG. 5, for example, if the storage areas 53 and 54 include valid write data, the next storage area which could be allocated would be storage area 52 and the dotted line from the register 57 indicates the pointer to this storage area. If this pointer is stored in the register 57, a simple incrementing on the pointer value provides a value indicating the last storage area to which valid data was written so that the value in the register 57 may be used to enable the multiplexor 56 to transfer the address of the data in the storage area 53 to the comparator 55.

In any embodiment of the invention, the same general rules obtain. Writes to memory from storage areas of the write buffer occur on a first-in (allocated) first-out basis. Merger with data in an allocated storage area or allocation of a new storage area for new data written to the buffer is determined by whether valid bytes exist at an entry having the same address. No write to memory is stalled to allow a merger to occur before the write takes place.

However, in some embodiments of the invention, other rules of storage in the write buffer and writing to memory are enforced. Thus, for example, if new valid data is written to a storage area from which data is to be written to memory in the same clock in which it would be merged, a number of boundary and speed path conditions are raised. For example, a decision whether to conduct a simple write or a read/modify/write must be made by the controller 21 before the data is written to memory; if a decision has already been made and then new data is merged in the storage area before the write, the result of the decision may be changed. In order to eliminate these boundary and speed path conditions, valid data is not written to a storage area from which data is to be written to memory in the same clock in which it would be merged. A consequence of enforcing this rule is that in an embodiment including a single comparator, data may not be merged with valid data in a storage area containing the only valid data in the write buffer; whether this condition exists may be determined by testing the condition of the pointers to the data next to be written to memory and to the storage area next to be written.

In one embodiment of the invention, a global valid bit and valid bits for each byte are provided for each data entry in a storage area of the write buffer. Then, when a write to memory occurs, only the global valid bit is invalidated. When the storage area is reallocated to data on a later write, the individual status bits are set in accordance with each byte of the data being stored during that entry.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A storage device for buffering data being transferred from a data source to a data destination, the storage device comprising:

storage circuitry comprising a plurality of storage locations to store data and associated data destination addresses;

a comparator to compare a first data destination address of input data, propagated from the data source, with only a second data destination address of stored data stored in the storage circuitry, the stored data being stored at a storage location most recently allocated to data; and input circuitry to store the input data in the storage circuitry in place of the stored data if the first data destination address corresponds to the second data destination address.

2. A storage device as claimed in claim 1 including a controller configured to transfer data to the data destination from a storage area allocated to data least recently.

3. A storage device as claimed in claim 2 in which the controller maintains a pointer to a storage area allocated to data least recently.

4. A storage device as claimed in claim 2 wherein input circuitry continues storing further input data in one of the plurality of storage locations until the controller begins to write data to the data destination from any one of the plurality of storage locations.

5. A storage device for buffering data being transferred from a source of data to a destination of data, the storage device comprising:

at least first and second storage locations, each to store data and an associated address at the destination;

means for comparing a first data destination address associated with input data, propagated from the source of data, to only a second data destination address associated with stored data stored at the first storage location, the first storage location having been allocated to data more recently than the second storage location; and means for writing only valid bits of the input data to the first storage location in place of bits of the stored data stored in the first storage location if the first and second data destination addresses correspond.

6. A storage device as claimed in claim 5 including means for writing to the destination all valid data in a storage location allocated to data least recently.

7. A storage device as claimed in claim 6 in which the means for writing to the destination includes means of maintaining a pointer to the storage location allocated to data least recently.

8. A storage device as claimed in claim 6 in which the means for writing only valid bits of the input data to the first storage location continues writing further input data to the first storage location until the means for writing to the destination begins to write data to the destination from either the first or second storage locations.

9. A method for buffering writes of data propagated from a source of data to a destination, the method comprising the steps of:

storing first and second data elements propagated from the source of data, and associated first and second addresses at the destination, in respective first and second storage locations in a write buffer, the second data element being allocated to the second storage location after the first data element is allocated to the first storage location;

comparing a third address associated with a third data element only with the second address; and storing the third data element in place of the second data element if the third address corresponds to the second address.

10. A method of buffering data propagated from a data source to a data destination, the method comprising the steps of:

storing a first data block, comprising first data and a first destination address, in a first storage location within a buffer, the buffer including a plurality of storage locations;

propagating a second data block, comprising second data and a second destination address from the data source for reception at the data destination;

comparing the destination address of the second data block with only the destination address of the first data block, the first storage location being the storage location within the buffer most recently allocated to a data block; and storing the second data in place of the first data in the first storage location in the buffer if the second destination address of the second data block corresponds to the first destination address of the first data block.

11. The method of claim 10 including the steps of identifying a valid portion of the second data and storing only the valid portion of the second data in place of a corresponding portion of the first data, wherein the valid portion of the second data and the corresponding portion of the first data are located at corresponding locations within the second and first data respectively.

12. The method of claim 11 wherein a validity indicator identifies valid bits of the second data, and wherein the step of storing the valid portion comprises overwriting, in the buffer, corresponding bits of the first data with the valid bits of the second data.

13. The method of claim 11 wherein a validity indicator identifies a valid byte of the second data, and wherein the step of storing the valid portion comprises overwriting, in the buffer, a corresponding byte of the first data with the valid byte of the second data.

14. The method of claim 10 wherein the buffer comprises first and second storage locations and wherein the first data is stored in the first storage location, the method including the step of storing the second data in the second storage location if the second destination address of the second data block does not correspond to the first destination address of the first data block.

15. The method of claim 10 wherein the buffer comprises a plurality of storage locations and wherein the first data is the only valid data stored in the buffer and is stored in a first storage location, the method comprising the step of storing the valid portion of the second data in one of the plurality of storage locations other than the first storage location.

16. The method of claim 10 wherein the first data block includes a validity indicator identifying a valid portion of the first data, the method including the further steps of:
    storing the validity indicator of the first data block in the buffer; and
    updating the validity indicator of the first data block with the validity indicator of the second data block if the second destination address of the second data block corresponds to the first destination address of the first data block, so as to create a validity indicator identifying a valid portion of buffer data stored in the buffer.

17. The method of claim 16 including the step of propagating a buffer data block, comprising the buffer data stored in the buffer, a destination address and the validity indicator identifying the valid portion of the buffer data, from the buffer to the data destination.

18. The method of claim 16 including the steps of overwriting a portion of data, stored at the destination address and corresponding to the valid portion of the buffer data, with the valid portion of the buffer data so as to create stored data.

19. The method of claim 18 including the step of generating an error correction code for the buffer data.

20. The method of claim 10 wherein the data destination comprises a memory resource and wherein the respective destination addresses of the first and second data blocks are addresses within the memory resource.

21. A buffer arrangement for buffering data, and an associated destination address at a data destination, propagated from a data source to the data destination, the buffer arrangement comprising:
    a plurality of storage locations including a first storage location storing first data and a first destination address associated with the first data, the first data being data most recently assigned to one of the plurality of storage locations;
    a comparator coupled to receive a second destination address associated with second data, and to compare only the first and second destination addresses; and
    input circuitry to overwrite a portion of the first data, stored within the storage location, with a valid portion of the second data, if the second destination address corresponds to the first destination address.

22. The buffer arrangement of claim 21 wherein a second validity indicator identifies the valid portion of the second data, the input circuitry being to identify the valid portion of the second data utilizing the second validity indicator.

23. The buffer arrangement of claim 22 wherein the input circuitry is to identify a valid byte of the second data utilizing the second validity indicator.

24. The buffer arrangement of claim 22 wherein a first validity indicator identifies a valid portion of the first data, the input circuitry being to update the first validity indicator utilizing the second validity indicator when a portion of the first data is overwritten with the valid portion of the second data.

25. The buffer arrangement of claim 21 wherein the buffer comprises a further storage location to store data and a destination address associated with the data, and wherein the input circuitry is to store the second data and the second destination address in the further storage location if the second destination address does not correspond to the first destination address.

26. The buffer arrangement of claim 21 wherein the buffer comprises a plurality of storage locations, and wherein the first data is the only valid data stored in the buffer, the input circuitry being to store the second data in one of the plurality of storage locations other than the first storage location in which the first data is stored.

27. The buffer arrangement of claim 21 including dispatch circuitry to propagate the contents of the first storage location from the buffer arrangement to the data destination.

28. A buffer arrangement for buffering data, and an associated destination address at a data destination, propagated from a data source to the data destination, the buffer arrangement comprising:
    storage means for storing first data and a first destination address associated with the first data, the first data being data being most recently stored in the storage means;
    comparator means coupled to receive a second destination address associated with second data, and for comparing only the first and second destination addresses; and
    input means for overwriting a portion of the first data, stored within the storage location, with a valid portion of the second data, if the second destination address corresponds to the first destination address.

29. A bus bridge configured to be coupled between first and second busses is a computer system, the bus bridge comprising a buffer arrangement for buffering data, and an associated destination address at a data destination, propagated from a data source via the first bus for reception at the data destination via the second bus, the buffer arrangement comprising:
    a storage location to store first data, and a first destination address associated with the first data, the first data being data most recently stored in the storage location;
    a comparator coupled to receive a second destination address associated with second data, and to compare only the first and second destination addresses; and
    input circuitry configured to overwrite a portion of the first data, stored within the storage location, with a valid portion of the second data, if the second destination address corresponds to the first destination address.

* * * * *